United States Patent [19]

Morishita

[11] 4,309,648

[45] Jan. 5, 1982

[54] CONTROL DEVICE FOR BATTERY CHARGING AC GENERATOR

[75] Inventor: Mitsuharu Morishita, Himeji, Japan

[73] Assignee: Mitsubishi Denki Kabushiki Kaisha, Tokyo, Japan

[21] Appl. No.: 950,520

[22] Filed: Oct. 11, 1978

[30] Foreign Application Priority Data

Oct. 18, 1977 [JP] Japan .................. 52/140518[U]

[51] Int. Cl.³ .............................................. H02J 7/16
[52] U.S. Cl. ....................................... 322/28; 322/99; 320/64
[58] Field of Search ............... 320/48, 64, 68; 322/28, 322/99, 59

[56] References Cited

U.S. PATENT DOCUMENTS 3,746,962  7/1973  Wright .
3,843,921  10/1974  Hill ........................................ 322/28

OTHER PUBLICATIONS

German Printed Application #2, 323, 323, 11/73, Allport.

Primary Examiner—Robert J. Hickey
Attorney, Agent, or Firm—Wenderoth, Lind & Ponack

[57] ABSTRACT

An AC generator charges a storage battery through a full-wave rectifier. The battery energizes a field generator coil through an indication lamp and two Darlington-connected transistors in their conducting state due to a flow of base current through them via a base resistor connected to the battery until a voltage across the generator reaches a predetermined magnitude. At that time, a Zener diode conducts to turn the two transistors off. The field coil is also connected to an intermediate voltage rectifier output terminal to be energized with a voltage from that terminal even if the filament of the charge indicating lamp is broken.

4 Claims, 2 Drawing Figures

CONTROL DEVICE FOR BATTERY CHARGING AC GENERATOR

BACKGROUND OF THE INVENTION

This invention relates to improvements in a control device for controlling a rectified output voltage from a battery charging AC generator to a predetermined magnitude for charging a storage battery.

Conventional control devices of the type referred to have included an initial excitation circuit through which an associated storage battery supplies a field current to a field coil of an AC generator involved to build up an AC voltage across the AC generator. The initial excitation circuit has included a parallel connected charge indication lamp and an initial excitation resistor so that, during a flow of field current through the circuit, the charge indication lamp is lighted, indicating that the storage battery is not charging. When a filament in that lamp has been broken because of long service, the entire field current flows through the parallel resistor to enable the initial excitation circuit. The use of such an initial excitation resistor has resulted in the necessity of employing a casing for that resistor, providing a space occupied thereby and electrically connecting the resistor to associated electric components. Therefore, the conventional control devices have been disadvantageous in that, in order to provide for the possibility of breaking of the filament in the charge indication lamp which might occur inherently even though with a small probability, complicated and expensive means have been required which rarely serve the intended purpose.

Accordingly, it is an object of the present invention to provide a new and improved control device for controlling a battery charging AC generator which does not include an initial excitation resistor such as has been previously required to be connected across a charge indication lamp.

SUMMARY OF THE INVENTION

The present invention provides a control device for controlling a battery charging AC generator, comprising, in combination, an AC generator driven by an internal combustion engine including a field coil, full-wave rectifier means connected to an output of the AC generator including a first, a second and a third rectified output terminal, the full-wave rectifier means producing DC outputs between the first and third rectified output terminals and between the second and third rectified output terminals respectively, a storage battery connected across the first and third rectified output terminals, voltage regulator means operatively coupled to the AC generator to control the output voltage therefrom to a predetermined magnitude by sensing the output voltage and controlling a field current flowing through the field coil in response to the sensed voltage, an output transistor disposed in the voltage regulator means series connected to the field coil between the second and third rectified output terminals, a starting key switch, a charge indication lamp connected across the second rectified output terminal and the storage battery through the starting key switch, and a base current-supply circuit connected to supply a base current to the output transistor from the storage battery but not through the charge indication lamp.

BRIEF DESCRIPTION OF THE DRAWING

The present invention will become more readily apparent from the following description taken in conjunction with the accompanying drawing in which.

DESCRIPTION OF THE PREFERRED EMBODIMENT

Figure 1:
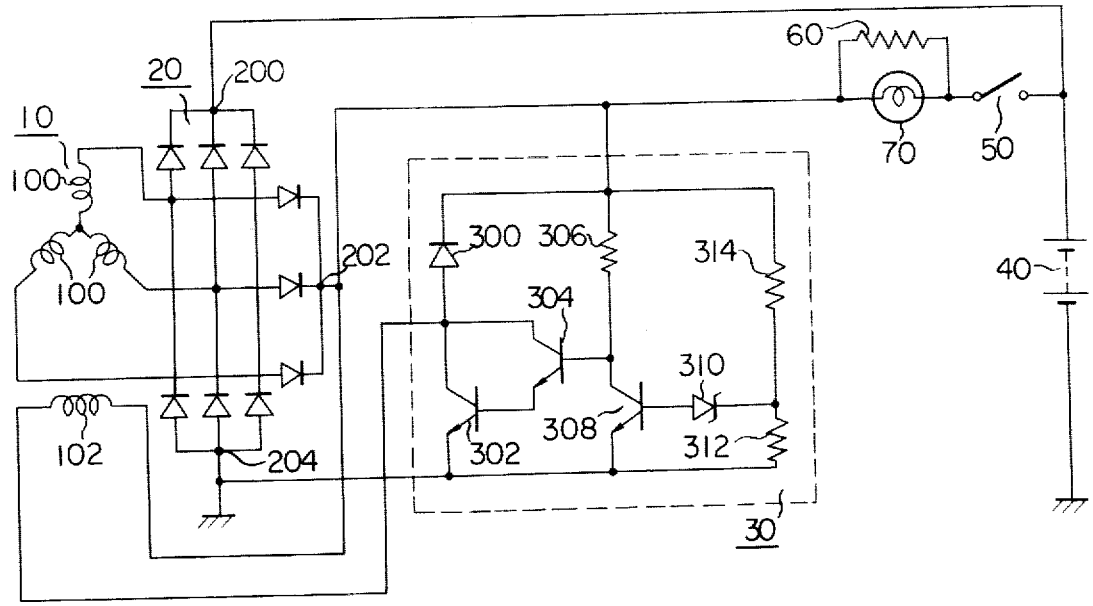
FIG. 1 is a circuit diagram of a control device for controlling a battery charging AC generator constructed in accordance with the principles of the prior art.

Referring now to FIG. 1 of the drawing, there is illustrated a conventional control device for controlling an AC generator for charging a storage battery. The arrangement illustrated comprises an AC generator generally designated by the reference numeral 10 and including an armature coil 100 connected in a three-phase star connection and a field coil 102, and a three-phase full-wave rectifier bridge generally designated by the reference numeral 20 connected to the armature coil 100 to full-wave rectify the AC output from the AC generator 10. The AC generator 10 is provided on a vehicle (not shown) and driven by an internal combustion engine (not shown) also provided on the vehicle, and the three-phase full-wave rectifier bridge 20 includes a first, a second and a third rectified output terminal 200, 202 and 204 respectively to produce a first and a second rectified voltage across the first and third output terminals and across the second and third out terminals respectively. The third output terminal 204 is connected to ground.

The field coil 102 of the generator 10 and the output terminals 202 and 204 are connected to a voltage regulator generally designated by the reference numeral 30 and operative to control the rectified output voltage from the generator 10 to a predetermined magnitude. More specifically, the voltage regulator 30 includes a semiconductor diode 300 connected at the anode electrode to the field coil 102 of the AC generator 10 and at the cathode electrode to the second output terminal 202 of the full-wave rectifier bridge 20 to absorb surges, and a pair of NPN transistors 302 and 304 interconnected in a Darlington configuration. The transistor 302 includes an emitter electrode connected to the third output terminal 204 of the full-wave rectifier bridge 20 and a collector electrode connected to both the field coil 102 of the generator 10 and the anode electrode of the diode 300 along with a collector electrode of the transistor 304. The two connected transistors 302 and 304 serve as a switching element for breaking and making a field current through the field coil 102. The transistor 302 is called an output transistor while the transistor 304 is called a driving transistor.

A base resistor 306 is connected at one end to a cathode electrode of the diode 300 and therefore to both the second output terminal 202 of the full-wave rectifier bridge 20 and the field coil 120 of the generator 10 and at the other end to both the base electrode of the transistor 304 and the collector electrode of an NPN transistor 308. The transistor 308 includes an emitter electrode connected to the emitter electrode of the transistor 302 and a base electrode connected to the anode electrode and a Zener diode 310. The transistor 308 is operative to effect the ON-OFF control of the transistors 302 and 304. The Zener diode 310 includes a cathode electrode connected to the junction of resistors 312 and 314 forming a voltage divider connected across the second and third output terminals 202 and 204 of the full-wave rectifier bridge 20. The Zener diode 310 is operative to sense the output from the generator 10 and be placed in its conducting state when the output voltage from the generator 10 reaches a predetermined magnitude.

The first output terminal 200 of the full-wave rectifier bridge 20 is connected to the positive side of a storage battery 40 having the negative side connected to ground and therefore to the third output terminal 204 of the full-wave rectifier bridge 20.

The positive side of the storage battery 40 is also connected to the second output terminal 202 of the full-wave rectifier bridge 20 and therefore to the field coil 102 of the generator 10 through a series connected of starting key switch 50 and an initial excitation resistor 60. A resistor 60 is connected across a charge indication lamp 70.

The operation of the arrangement shown in FIG. 1 will now be described. In order to start the internal combustion engine (not shown), the key switch 50 is closed to permit the storage battery 40 to supply a base current to the transistors 304 and 302 through the now closed switch 50, the parallel connected resistor 60 and the indication lamp 70 and the base resistor 306 to place the transistors 304 and 302 in their conducting state. This causes the storage battery 40 to supply a field current to the field coil 102 of the generator 10 through the components 50, 60 and 70 and the now conducting transistors 304 and 302 resulting in the generation of a field magnetomotive force. At that time, a potential difference is developed across the inital excitation resistor 60 to fire the charge indication lamp 70. This indicates that the storage battery 40 is not charging.

In this state the internal combustion engine is started to drive the generator 10. The generator 10 induces an AC output across the armature coil 100 as determined by the speed of rotation thereof. The induced AC output is full-wave rectified by the three-phase full-wave rectifier bridge 20. If the rectified output voltage from the full-wave rectifier bridge 20 is no higher than a predetermined magnitude then the potential at the junction of the resistors 312 and 314 still remains low enough to maintain the Zener diode 310 in its nonconducting state. Thus the output voltage from the generator 10 rises with an increase in speed of rotation of the generator 10.

Thereafter the generator 10 further increases its speed of rotation until the output voltage therefrom becomes equal to or higher than the predetermined magnitude. At that time, the potential at the junction of the resistors 312 and 314 is also high enough to cause the Zener diode 310 to conduct. When conductive, the Zener diode 310 causes a base current to flow through the transistor 308 via the diode to place the transistor 308 in a conducting state. The conduction of the transistor 308 causes the transistors 304 and 302 to become non-conducting resulting in the interruption of the field current flowing through the field coil 102 of the generator 10. Therefore, the output voltage from the generator 10 is decreased. When this output voltage decreases sufficiently so that it is less than the predetermined magnitude, the Zener diode 310 is again brought into its non-conducting state to change the transistor 308 back to the non-conducting state. This causes the transistors 304 and 302 to be conductive again to permit the field coil 102 of the generator 10 also to be energized with the result that the output voltage of the generator 10 again increases.

The process as above described is repeated to control the output voltage from the generator 10 to the predetermined magnitude. This controlled voltage is full-wave rectified and then applied to the storage battery 40 to charge the latter to a predetermined voltage.

On the other hand, the rectified voltage developed across the second and third output terminals 202 and 204 of the full-wave rectifier bridge 20 becomes substantially equal to the voltage across the storage battery 40. At that time, the potential difference across the resistor 60 decreases to deenergize the charge indication lamp 70. This indicates that the storage battery 40 is charging.

The filament in the charge indication lamp 70 could be broken after long service. In order that, with the lamp 70 filament broken, the storage battery 40 supplies the field current to the field coil 102 of the generator 10 through the transistors 304 and 302 to excite initially the generator 10, the initial excitation resistor 60 has been connected across the charge indication lamp 70. This has resulted in the necessity of using a casing for the initial excitation resistor, providing a space which is occupied by the casing and electrically connecting the resistor to the associated electric components. Accordingly, the arrangement of FIG. 1 has been disadvantageous in that, in order to provide for the possibility of breaking of the filament of the charge indication lamp, it has been necessary to use an initial excitation resistor which results in complicated, expensive means and moreover such means rarely serves the intended purpose because the breaking of the filament occurs only infrequently.

The present invention seeks to eliminate the disadvantage of the prior art practice as above described by omitting the inital excitation resistor.

Figure 2:
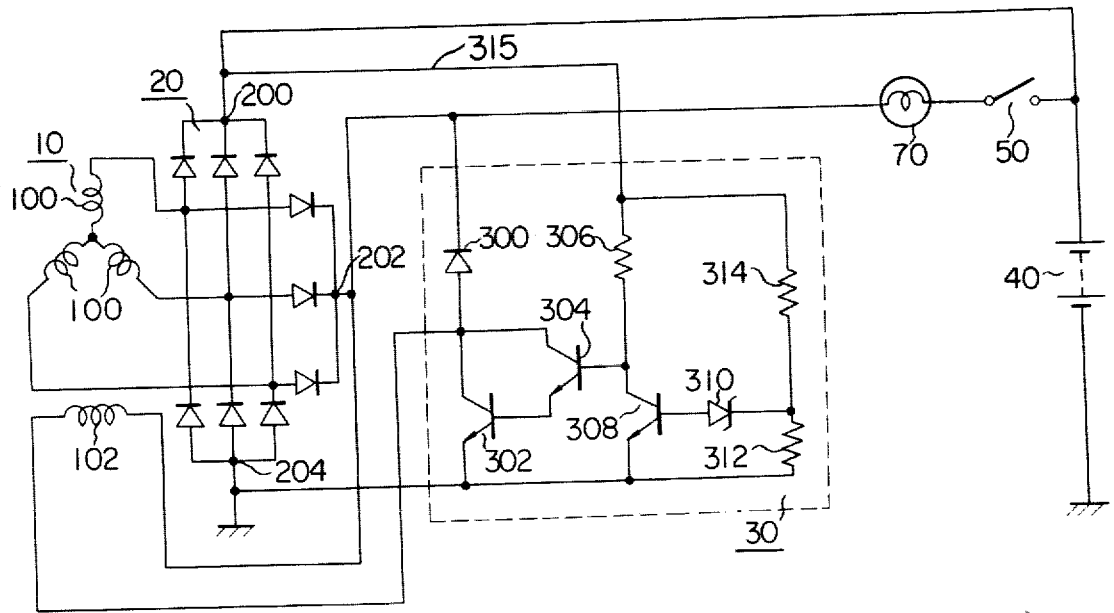
FIG. 2 is a circuit diagram of a control device for controlling a battery charging AC generator constructed in accordance with the principles of the present invention.

Referring now to FIG. 2 wherein like reference numerals designate the components identical to those shown in FIG. 1, there is illustrated one embodiment of the present invention. The arrangement illustrated is different from that shown in FIG. 1 only in that in FIG. 2, the base resistors 306 and the series connected resistors 314 and 312 are connected by a lead 315 to the electric lead connecting the first output terminal 200 to the positive side of the storage battery 40 instead of to the output terminal 202 and the inital excitation resistor 60 as shown in FIG. 1 is omitted. Therefore, a circuit for supplying the base current to the transistors 304 and 302 is formed of the current path from the battery 40, through the base resistor 306, the base-to-emitter path of the transistor 304, the base-to-emitter path of the transistor 302, ground, and thence to the battery 40.

The operation of the arrangement shown in FIG. 2 will now be described. Assuming that the charge indication lamp 70 is in order, i.e. that the filament of the lamp 70 is not broken, the base current is always supplied to the transistors 304 and 302 through the base current-supply circuit as above described, to maintain those transistors in their conducting state. In order to start an internal combustion engine (not shown) under these circumstances, the starting key switch 50 is closed to permit the storage battery 40 to supply a field current to the field coil 102 of the AC generator 10 through the now closed switch 50, the charge indication lamp 70 and the now conducting transistors 302 and 304 to generate a field magnetomotive force. At that time, the lamp 70 is fired to indicate that the storage battery is not charging.

Even if the filament of the lamp 70 is broken after long service, the transistors 304 and 302 always have the base current applied from the storage battery 40 through the base resistor 306. Therefore, each of those transistors 304 and 302 is placed in its conducting state and has a collector-to-emitter voltage having a low magnitude no higher than 1.0 volt. When the engine is started to drive the generator 10 in this state, a residual magnetic flux existing in a field core (not shown) for the field coil 102 functions to produce an AC output across the armature coil 100. Then this AC output is full-wave rectified by the full-wave rectifier bridge 20 and the output thus rectified is developed at the second output terminal 202 of the rectifier bridge 20 to cause a field current to flow through the field coil 102 and the transistors 304 and 302. Thus the generator 10 is operated in a self-excited manner at a number of rotations per minute that is practically be out of the question and equal to or less than 2,000 rpm.

Thereafter the second output terminal 202 of the full-wave rectifier bridge 20 develops thereat a full-wave rectified voltage exceeding a predetermined magnitude. This causes an increase in voltage at the junction of the voltage dividing resistors 312 and 314. Thereby the Zener diode 310 is placed in its conducting state. Thus the transistor 308 is caused to conduct and the transistors 304 and 302 become non-conducting with the result that the field current is interrupted to decrease the output voltage from the generator 10. When this output voltage decreases to a predetermined magnitude, the Zener diode 310 and therefore the transistor 308 is turned off and the transistors 304 and 302 are again placed in their conducting state. Therefore the generator 10 output voltage again increases.

The process as above described is repeated to control the output voltage from the generator 10 to keep it at the predetermined magnitude and to charge the storage battery 40 with this controlled voltage.

While the present invention has been illustrated and described in conjunction with a single preferred embodiment thereof it is to be understood that numerous changes and modifications may be restored to without departing from the spirit and scope of the present invention. For example, the base resistor 306 shown in FIG. 2 is connected to the electric lead connecting the first output terminal 200 of the full-wave rectifier bridge 20 to the positive side of the storage battery 40 but the same may be connected directly to the first output terminal 200.

What is claimed is:

1. A device for charging a battery comprising, in combination:
   an AC generator having a field coil;
   a full-wave rectifier means connected to the AC output of said AC generator and including a first, a second and a third rectified output terminal, said full-wave rectifier means producing DC outputs between said first and third rectified output terminals and between said second and third rectified output terminals respectively;
   means for connecting a storage battery across said first and third rectified output terminals and including a lead connecting said first rectified output terminal to said storage battery;
   voltage regulator means operatively coupled to said AC generator for controlling the output voltage therefrom to a predetermined magnitude by sensing said output voltage and controlling the field current flowing through said field coil in response to the sensed voltage, said voltage regulator means having an output transistor means series connected to said field coil between said second and third rectified output terminals;
   a starting key switch and a charge indication lamp connected in series between said second rectified output terminal and said storage battery; and
   a base current-supply circuit for supplying a base current to said output transistor means and having a base resistor connected directly to said first rectified output terminal.

2. A device as claimed in claim 1 wherein said output transistor means includes an output transistor and a driving transistor connected to said output transistor in a Darlington configuration.

3. A device as claimed in claim 1 wherein said output transistor means includes an output transistor and a driving transistor connected to said output transistor in a Darlington configuration, said driving transistor including a base electrode, and said base resistor being connected to said base electrode of said driving transistor.

4. A device as claimed in claim 1 wherein said output transistor means includes an output transistor and a driving transistor connected to said output transistor in a Darlington configuration, said driving transistor including a base electrode, and said base resistor being connected to said base electrode of said driving transistor.

* * * * *